United States Patent [19]
Aoki

[11] 3,991,696
[45] Nov. 16, 1976

[54] HULL OF A SMALL-SIZED SHIP
[75] Inventor: Shigemitsu Aoki, Hamamatsu, Japan
[73] Assignee: Yamaha Hatsudoki Kabushiki Kaisha, Iwata, Japan
[22] Filed: Dec. 23, 1974
[21] Appl. No.: 536,002

[30] Foreign Application Priority Data
Dec. 29, 1973 Japan.................................. 49-1146
Oct. 16, 1974 Japan............................. 49-118887
Oct. 16, 1974 Japan............................. 49-118888

[52] U.S. Cl..................................... 114/56; 114/57
[51] Int. Cl.²........................................... B63B 1/04
[58] Field of Search.................... 114/56, 57, 66.5 R, 114/132, 66.5 S; 9/6 P; 115/39

[56] References Cited
UNITED STATES PATENTS

| | | | |
|---|---|---|---|
| 2,167,688 | 8/1930 | Scowley............................ | 114/56 |
| 2,729,183 | 1/1956 | Owen............................... | 114/66.5 S |
| 2,784,691 | 3/1957 | MacMillan, Jr...................... | 115/39 |
| 3,045,629 | 7/1962 | Farrington ...................... | 114/66.5 R |
| 3,634,898 | 1/1972 | Geiger............................... | 9/6 P |
| 3,716,011 | 2/1973 | Butler ............................... | 114/132 |
| 3,808,999 | 5/1974 | Peterson ............................. | 114/56 |

Primary Examiner—Trygve M. Blix
Assistant Examiner—Stuart M. Goldstein
Attorney, Agent, or Firm—Donald D. Mon

[57] ABSTRACT

A hull for a small-sized ship has a planing type bottom and a stern having an area curve substantially the same as that of a displacement type hull, whereby during a low speed travelling period the ship is allowed to be travelled under substantially the same characteristics as those of a displacement type hull, while during a high speed travelling period it is allowed to be travelled under substantially the same travelling characteristics as those of a planing type hull.

12 Claims, 15 Drawing Figures

HULL OF A SMALL-SIZED SHIP

This invention relates to a hull for a small-sized ship, such as a fishing boat, motor sailer etc., which is used in a wide speed range.

Hulls for small-sized ships are, viewed from the shape of the hull under the water line, generally classified into three categories: a displacement type hull for a low speed range, a semi-planing type hull for a medium speed range and a planing type hull for a high speed range.

The displacement type hull is suitable for a low speed travelling. The ship of this type is travelled primarily under a hydrostatic pressure with a hull bottom submerged relatively deep under a water line. In an attempt to reduce frictional resistance and wave making resistance the hull bottom often is given a streamline shape, and a lateral crosssectional area under the water line as measured on a still water is maximal at the middle of the hull and is gradually decreased from midship toward the end of the stern. The hull bottom is curved upward from the middle of the hull toward the bow and stern, respectively. When the displacement type hull is travelled at high speeds, it is subjected to a dynamic water pressure tending to lift the front half portion of the hull upwardly, while at the same time it is subjected to a dynamic water pressure tending to pull the rear half portion of the hull downwardly. The hull, therefore, has a greater attack angle with the bow lifted upwardly and the stern pulled downwardly, increasing water resistance to the hull and making it very difficult to effect high speed travelling. To avoid such a situation attempt is made to, for example, move crew-members toward the bow of the ship, thereby shifting the center of gravity of the ship. This, however, provides no essential settlement to this problem.

The planing type hull is suitable for high speed travelling. The hull of this type has, in an attempt to provide a suitable attack angle during the high speed travelling period to the hull and effectively support a hull bottom by a dynamic water pressure, a substantially planar, wide planing surface at the bottom and a substantially vertical planar transom at the rear end of the stern. The lateral cross-sectional area under the water line of the hull is maintained substantially constant at the rear half portion of the hull. When the ship of this type is travelled at low speeds, water flowing along each side wall of the hull is turned inward behind the transom, creating an eddy current. The eddy current imparts a resistance tending pull back the hull rearwardly. For this reason, the planing type hull is subjected to a relatively large travelling resistance during the low speed travelling period, as compared with the displacement type hull, resulting in a prominently greater propulsion loss.

The semi-planing type hull is suitable for a medium speed range, i.e., a speed range intermediate between the displacement type hull and the planing type hull. The lateral cross-sectional area under the water line of the hull is slightly decreased from midship to the rear end of a stern where it shows a value intermediate between the displacement type hull and the planing type hull. In other words, the semi-planing type hull shows a poor performance in the low speed range as compared with the displacement type hull and in the high speed range as compared with the planing type hull.

As will be evident from the above-mentioned explanation, an optimum designing speed range is determined dependent upon the type of hulls. In the case of the displacement type hull, a speed/length ratio (speed/ $\sqrt{\text{water line length}}$) is restricted to a range of below 1.5 kn/ft½; in the case of the semi-planing type hull, a range of 1.5 to 3.5 kn/ft½; and in the case of the planing type full, a range of above 2.5 km/ft½. If, therefore, the speed-length ratio is off the optimal range, a poor performance results.

It is accordingly the object of this invention to provide a hull for small-sized ships which travels efficiently in all the speed ranges.

According to this invention, a hull for small-sized ships comprises a stern having such a configuration that, during mooring, a lateral cross-sectional area under a water line of the hull is gradually decreased from midship toward the rear end of the stern, and a planing bottom having a buttock line extending from the midship toward the rear end of the stern in a manner to describe a substantially straight line, whereby during a low speed travelling period the ship travels under substantially the same characteristics as those of the displacement type hull, while during a high speed travelling period it travels under substantially the same characteristics as those of the planing type hull.

A curve of a lateral cross-sectional area under a water line as measured between a fore perpendicular and an after perpendicular is referred to hereinafter as an "area curve."

Since the hull according to this invention has the above mentioned area curve, during a low speed travelling period water flowing along each side of the hull smoothly meets behind the rear end of the stern to thereby prevent generation of a force tending to pull the hull rearwardly, while during a high speed travelling period the planing bottom of the hull is supported by a dynamic water pressure and the ship can be efficiently travelled on a water surface in a manner to maintain an appropriate attack angle without shifting the center of gravity of the ship and/or without mechanically moving the bottom of the hull.

In a preferred embodiment of this invention the stern of the hull has a current member extending rearwardly from the rear end of the stern and having lower surface portions constituting part of the hull bottom and rearwardly outwardly inclined upper surface portions submerged, during mooring, under the water line.

In another preferred embodiment of this invention the stern of the hull has a pair of recesses one at each side thereof. The recesses are gradually increased in depth toward the central longitudinal cross section as they approach toward the rear end of the stern. Rearwardly of the stern a pair of blade portions are formed each having an upper surface constituting the lower side surface of the recess and a lower surface constituting part of the planing bottom portion of the hull. During mooring, the upper surface of the blade portion is situated under the water line.

This invention will be further described by way of example by reference to the accompanying drawings, in which.

Figure 1:
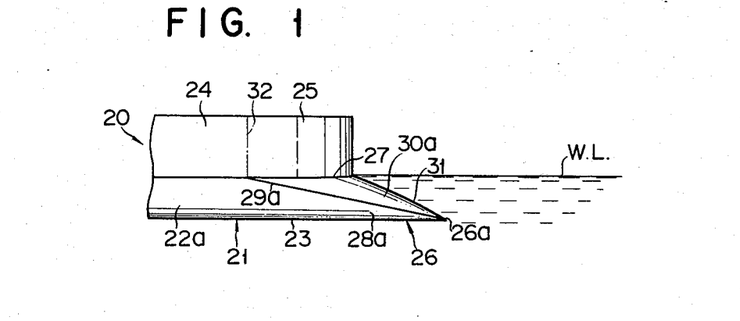
FIG. 1 is a partial side view showing the rear half portion of a hull according to one embodiment of this invention.
Figure 2:
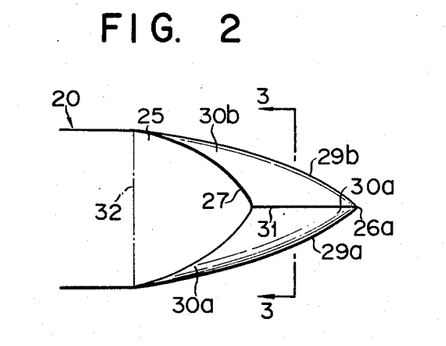
FIG. 2 is a plan view of FIG. 1.
Figure 3:
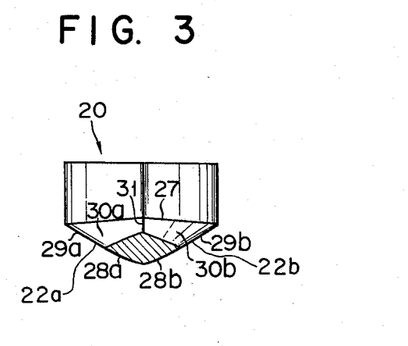
FIG. 3 is a cross-sectional view taken along line 3—3 of FIG. 2.

A hull 20 shown in FIGS. 1 to 3 has a planing type bottom surface 21 at its rear half section. The bottom surface 21 of the hull 20 assumes a V-shaped cross-section and consists of substantially planar surface portions 22a, 22b connected at a linear angular edge 23 which is situated on a central longitudinal cross-section of the hull, and has a buttock line extending in a manner to describe a substantially straight line. A stern 24 of the hull 20 has a rearwardly tapered upper half section 25 triangular in cross section and a substantially tetragonal pyramid-like tail section or current member 26 extending rearwardly of the lower section of the hull. A tail end or end apex 26a of the current member 26 is situated rearwardly of the rear end of the upper half section of the stern 24. A connecting line 27 defined between the upper end of the current member 26 and the upper half section 25 of the stern 24 is so designed that during the mooring of the ship it is situated substantially on a water line W.L.

The current member 26 is formed in a substantially pyramidic shape whose cross section perpendicular to the central axis of the hull assumes a substantial rhombus as shown in FIG. 3 and is symmetrical to the central longitudinal cross-section of the hull. A pair of lower surfaces 28a, 286 of the current member 26 constitute the end portion of the bottom surface 21 of the hull 20. In other words, the lower surfaces 28a, 28b of the current member 26 are continuously connected to the planar surface portions 22a, 22b of the bottom surface 21 without leaving any stepped portion, and have a substantially straight buttock line. Side edge portions 29a, 29b of the current member extend obliquely downwardly from both the sides of the stern 24, respectively, and terminate in the tail end 26a. The side edge portions 29a, 29b of the current member are slightly outwardly curved, thereby increasing the area of the lower surfaces 28a, 28b of the current member. Upper surfaces 30a, 30b of the current member are inclined rearwardly downwardly from the abovementioned connecting line 27 toward the side edge portions 29a, 29b of the current member, and an edge 31 defined between the upper surfaces 28a, 28b of the current member is situated on the central longitudinal cross-section of the hull 20 and inclined rearwardly. From the above it will be understood that the current member 26 has a lateral cross-sectional area gradually reduced toward the tail end.

Figure 4:
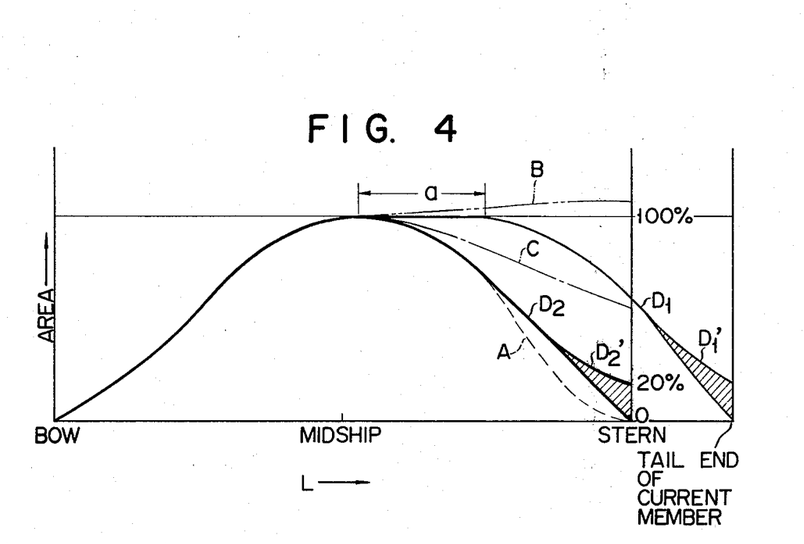
FIG. 4 is a graph showing area curves of the hull according to this inventon and conventional hulls.

In a graph shown in FIG. 4 an abscissa denotes a length from a fore perpendicular to an after perpendicular, while an ordinate denotes a cross-sectional area under the water line as taken in a transverse direction of the hull. In FIG. 4 a broken line A indicates an area curve of a conventional displacement type hull, a double-dot chain line B indicates an area curve of a conventional planing type hull, a dot chain line C indicates an area curve of a conventional semi-planing hull, and a thin solid line D1 indicates an area curve of the hull according to the above-mentioned embodiment of this invention. The area curve A of the displacement type ship gradually ascends from the bow toward the center of the hull where it shows a peak, and gradually descends from the center of the hull toward the tail end of the tail section where it shows a zero. Viewed from the bow toward the center of the hull, the area curve B of the planing type hull substantially corresponds to the area curve A of the displacement type hull, but viewed from the center of the hull toward the stern, it extends substantially in a horizontal direction and terminates in the end of the stern at a level substantially the same as the level of the center of the hull. The area curve C of the semi-planing hull, viewed from the center of the ship to the stern, describes a locus substantially intermediate between the area curves A and B. Though the hull according to this invention has the planing bottom surface 21, it exhibits the area curve D1 gradually declining toward the stern of the hull, due to the presence of the current member 26. The area curve D1 is substantially the same as that of the displacement hull except for a substantially horizontal portion, as indicated by $a$ in FIG. 4, corresponding to the middle of the hull.

Though with the above-mentioned embodiment the cross-sectional area of the tail end 26a as measured under the water line of the hull indicates a zero, it was found that if it corresponds to below 20% of a maximum cross-sectional area under the water line as measured between the fore perpendicular and after perpendicular, the desired object can be attained (curve D1').

The operation of the embodiment according to this invention will now be explained below.

During a low-speed travelling period, the hull 20 has a water line situated substantially at the same W. L. level as that in which it is in its berth. Since the cross-sectional area of the hull as measured under the water line is gradually rearwardly decreased from the front end of the current member 26 i.e. the end of the side edge portions 29a, 29b due to the configuration of the current member 26, water in the neighborhood of the stern flows smoothly along the lower surfaces 28a, 28b and upper surfaces 30a, 30b of the current member. For this reason, the hull 20 is subjected to only a slight frictional resistance as encountered in the displacement type hull and it is subjected to no negative pressure resistance tending to rearwardly pull back the hull as experienced in the planing type ship.

As the speed approaches to a semi-planing speed, a dynamic hydraulic pressure acting on the forward portion of the bottom surface of the hull is increased, tending to raise the bow and lower the stern. Water passed through the neighborhood of the rear half section of the bottom surface 21 flows rearwardly and outwardly from both the sides of the hull, while being forced downwardly by the lower surfaces 28a and 28b of the current member 26. The resultant reaction force tends to raise the stern of the hull. The reaction force prevents sinking of the stern and therefore prevents creation of an excessive attack angle. Since with this embodiment the tail end of the current member 26 is situated rearwardly of the rear end of the upper half section 25 of the stern 24, the reaction force effectively works due to its greater moment arm. As a result, the ship can be travelled with a minimum pressure resistance, while maintaining an appropriate attack angle. As the speed is increased to high speed, a dynamic hydraulic pressure is further increased, raising the hull 20 upward in a manner to maintain an appropriate attack angle. At this time, the hull 20 is supported on the water surface by the surface portions 22a and 22b of the bottom surface 21 and the lower surfaces 28a and 28b of the current member 26 and assumes a "planing" state as encountered in a planing type ship.

Figure 5:
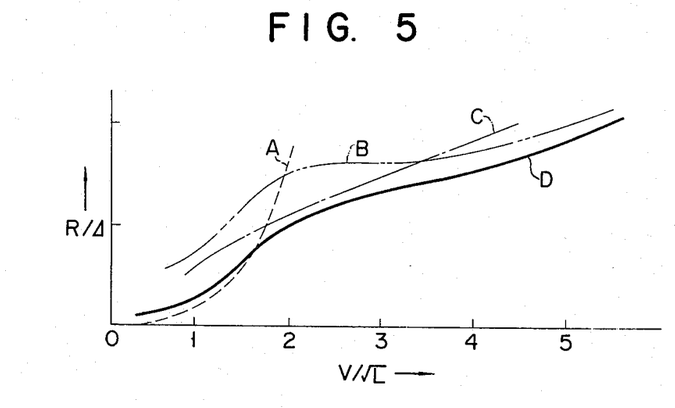
FIG. 5 is a graph showing travelling characteristics of the hull according to this invention and the conventional hulls.

In a graph shown in FIG. 5 a speed-length ratio $V/\sqrt{L}$ is plotted as an abscissa and a travelling resistance/ hull weight ratio ($R/\Delta$) is plotted as an ordinate. In FIG. 5, a broken line A shows the characteristic curve of the conventional displacement type ship, a double-dot chain line B shows the characteristic curve of the conventional planing type ship, a dot chain line C shows the characteristic curve of the conventional semi-planing ship, and a solid line D shows the characteristic curve of the ship according to the embodiment of this invention.

As will be seen from FIG. 5, with the speed-length ratio of below 1.5 i.e. at low speed, the displacement type ship (curve A) is subjected to only a slight travelling resistance. Where, however, the speed-length ratio exceeds 1.5, the ship is subjected to an extremely large resistance due to an excessively large attack angle. In the case of the speed length ratio being below 2.5, the planing type ship (curve B) undergoes a relatively great travelling resistance. However, with the speed-length ratio of above 2.5, i.e. at high speed, the travelling resistance shows only a slight increase. With the speed-length ratio 1.5 to 3.5 i.e. at medium speed, travelling resistance acting upon the semi-planing type ship (curve C) is smaller than any resistance as encountered in the displacement type and planing type ships. In the case of the speed length ratio being below 1.5 or above 3.5 the travelling resistance of the semi-planing type ship exceeds the resistance as encountered in the displacement type or planing type ship. In contrast, travelling resistance acting upon the ship (curve D) according to this invention approximates, in the case of the speed-length ratio being below 1.5, to the resistance as involved in the displacement type ship due to the configuration of the current member 26. Where the speed-length ratio falls within the range of 1.5 to 3.5, the travelling resistance approximates to the resistance as encountered in the semi-planing ship, due to no excessive attack angle being involved. In the case of the speed-length ratio exceeding 3.5, the hull is supported on the water surface by the bottom surface 21 of the hull. Consequently, the ship is subjected to substantially the same travelling resistance as encountered in the planing type ship. From the above it will be appreciated that the ship according to this invention has travelling characteristics most appropriate at the respective speed ranges.

As far as the above-mentioned travelling resistance is taken into consideration, the configuration of the upper half section of the stern of the hull according to this invention as supported above the water line imparts substantially no influence to the travelling characteristics of the ship. For this reason, the stern 24 may have a vertical rear end, as indicated by a dot chain line 32 in FIGS. 1 and 2, instead of having the upper half section 25 triangular in cross section. The current member 26 extending rearwardly of the rear end of the stern may take any form if it has such a shape that its cross-sectional area as measured under the water line is gradually decreased. For example, the current member may take a flattened conical shape having a planing bottom surface.

Figure 6:
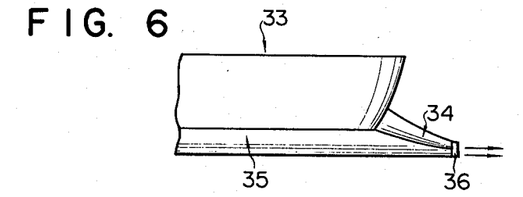
FIG. 6 is a side view showing a modified current member as opposed to a current member of FIG. 1.

In a modification shown in FIG. 6 a hull 33 has at its stern a current member formed as a unit 34 for a jet port 36. A hull bottom 35 and the unit 34 of the modification are substantially similar in shape to the bottom 21 and current member 26 of the above-mentioned embodiment, respectively, except that the unit 34 has the jet port at the rear end. The jet port 36 is connected, through a connecting pipe (not shown) provided within the unit 34, to a jetting mechanism within the hull and adapted to impart propulsion force to the hull by spurting a stream of water rearwardly. The cross-sectional area under the water line of the rear end of the stern of the modified embodiment corresponds to 20% of the maximum midship cross-sectional area as measured under the water line (see the area curve d1" in FIG. 4), since the jet port 36 is provided in the current member.

The modified embodiment is substantially identical in operation characteristics to the first embodiment.

Figure 7:
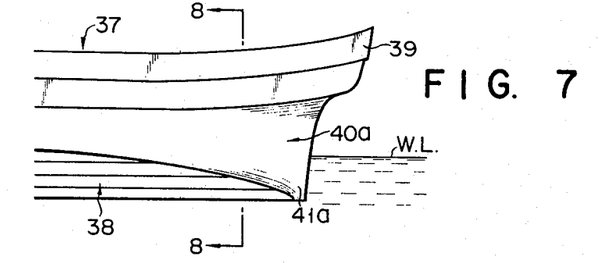
FIG. 7 is a partial side view showing another embodiment of this invention.
Figure 8:
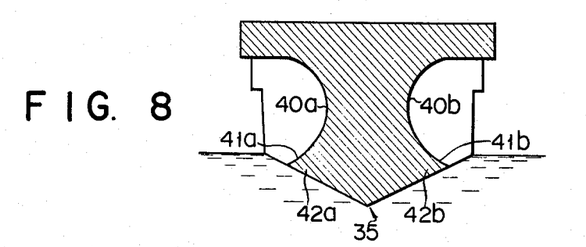
FIG. 8 is a cross-sectional view taken at line 8—8 of FIG. 7.

FIGS. 7 and 8 show another embodiment applied to a fishing boat. A hull 37 has a planing type bottom 38 having a substantially straight buttock line as in the above-mentioned embodiment, and a stern 39 having a pair of recesses 40a, 40b one at each side thereof instead of the tail or current member 26. The recesses 40a, 40b extend from the midship toward the stern in a manner to be gradually increased in depth toward a central longitudinal cross-section of the hull. As a result, blade portions 42a and 42b are provided having bottom surface portions at the lower side and inner surface portions 41a and 41b at the upper side. The inner surface portions 41a, 41b i.e. the upper surfaces of the blade portions 42 are declined rearwardly and downwardly as the upper surface portions 30a and 30b of the current member 26, and designed to be situated under the water line W.L. during the mooring of the ship. The hull 37 has an area curve corresponding to a thick solid line D2 of FIG. 4. The area curve D2 shows a maximum cross-sectional area, under the water line, which corresponds to the middle of the hull, and it is gradually decreased from there toward the end of the stern where it shows substantially zero. That is to say, the area curve D2 is substantially the same as the area curve A of the displacement type of the hull. If, however, the cross-sectional area under the water line which corresponds to the rear end of the stern is less than 20% of the maximum cross-sectional area under the water line (see a thick solid line D2'), the object of this invention can be attained. The hull 37 is substantially identical in operation to the above-mentioned embodiment.

Figure 9:
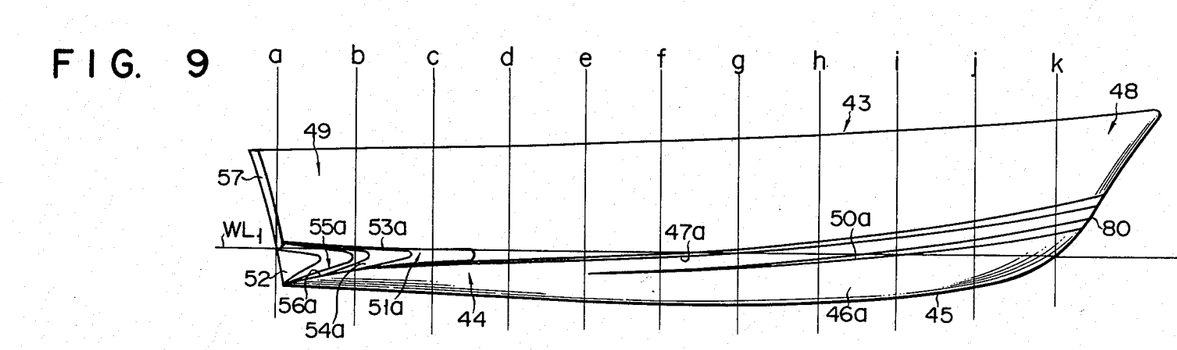
FIG. 9 is a side view showing another embodiment of this invention.
Figure 10:
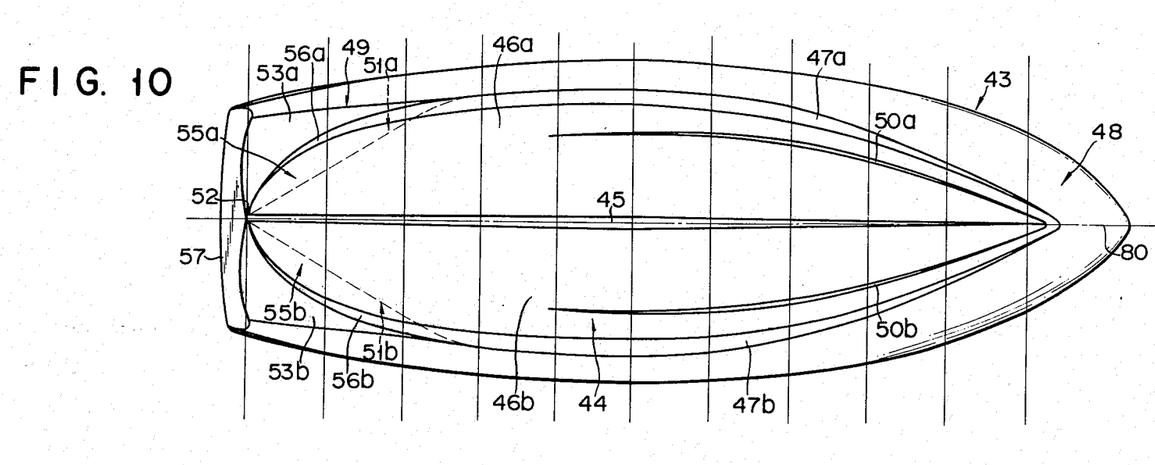
FIG. 10 is a bottom view of FIG. 9.
Figure 11:
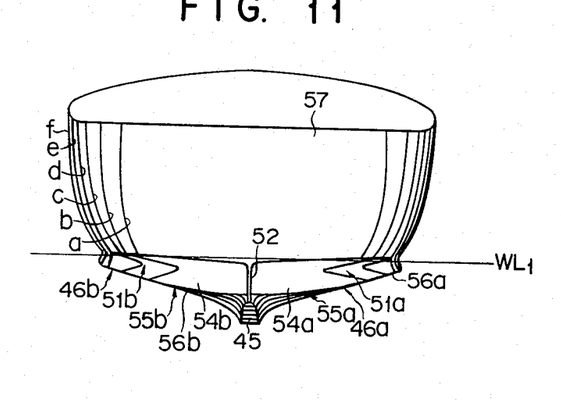
FIG. 11 is a rear view of FIG. 9.
Figure 12:
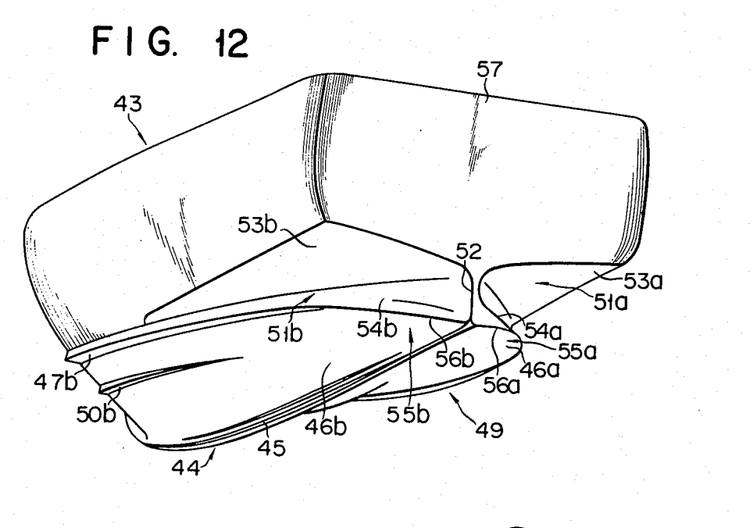
FIG. 12 is a perspective view of the hull of FIG. 9.

FIGS. 9 to 12 show another embodiment applied to a motor sailer. This is a real and more detailed version of the hull shown in FIGS. 7 and 8. A hull 43 is formed of a suitable material such as FRP (Fibreglas Reinforced Plastics) and has a planing type bottom 44. To explain more in detail, the hull bottom 44 assumes a V-shaped cross-section and consists of a pair of bottom surface portions 46a, 46b connected at an angular edge 45 which is situated on a central longitudinal cross-section of the hull. The front half portions of the bottom surface portions 46a and 46b assume a relatively rounded configuration and they meet each other at a relatively acute intersecting angle below a bow 80. The rear half portions of the bottom surface portions 46a and 46b are smoothly and continuously connected to the front half portions thereof and assume a relatively planar configuration with the intersecting angle being increased toward the rear end of the hull. The buttock line of the rear half portion of the hull bottom 44 assumes a substantially straight line as in the above-mentioned embodiment. Provided one at each side of the ship are a pair of chines 47a, 47b for preventing an ascent of water along the outer wall of the ship during "planing" travel. The chines extend from the front end of the bow 48 along the upper outer edge of the bottom 44 toward the rear end of the stern 49. Below the chine are provided a plurality of stripes (in this embodiment, one below each chine) extending from the front end of the bow toward the midship. Above the water line W.L. of the rear end of the stern 49 is provided a substantially planar transom 57 substantially parallel to the midship lateral cross-section. The transom 57 is situated rearwardly of the rear end of the bottom 44. The hull 43 has a maximum breadth substantially at the mid-position (line f of FIG. 9) of $L_{pp}$ (length between perpendiculars) as measured from the fore perpendicular k (FIG. 9). Provided one at each side of the stern 49 are a pair of recesses 51a, 51b extending toward the rear end of the stern. The forward end of the recess is preferably situated at or rearwardly of a portion corresponding to a maximum breadth of the hull and forwardly of a hull portion (line b in FIG. 9) corresponding to 90% of $L_{pp}$ as measured from the fore perpendicular. If the forward end of the recess is situated forwardly of the portion corresponding to the maximum breadth of the hull, water positively and inconveniently flows into the recesses 51a, 51b, tending to prevent the hull from assuming a planing attitude. If, on the other hand, the starting point of the recess is situated rearwardly of the line b in FIG. 9, an area curve is rapidly dropped. In this embodiment, the forward end of the recess is situated in a positive (anywhere between d and c in FIG. 9) corresponding to 70 to 80% of $L_{pp}$ as measured from the fore perpendicular.

The recesses 51a and 51b are symmetrically provided with respect to a central longitudinal cross-section and gradually increased in depth toward the rear end of the stern, where they are close to each other with a narrow terminal edge 52 sandwiched therebetween. Upper wall surfaces 53a and 53b of the recesses 51a and 51b are substantially horizontal and are situated, during mooring, a little above the water level, while lower wall surfaces 54a and 54b of the recesses 51a and 51b are outwardly and downwardly inclined at a relatively great angle. As a result, a pair of blade portions 55a and 55b are integrally formed with the hull and have wall surfaces 54a and 54b at the upper side and bottom surface portions 46a and 46b at the lower side. A connecting edge 56a or 56b between the lower wall surface (sometimes called "lower side surface") and the bottom surface portion of the blade portion, i.e. an outer edge 56a or 56b of the blade portion, extends rearwardly, in a continuous fashion, from the chine 47a or 47b. The recesses are defined by respective wall surfaces. In this embodiment the term "wall surface" includes the upper and lower wall surfaces. The outer edges 56a and 56b are slightly downwardly inclined in a curvilinear fashion toward the narrow terminal edge 52 where they are connected to each other. The edges 56a and 56b are parabolically formed in a manner not to extend beyond the side walls of the stern. For this reason, the blade portions 55a and 55b are not injured or damaged by the wall of the pier when the ship comes alongside the pier. Moreover, even if an angle $\alpha$ to be later described is made small, the blade portions exhibit a sufficient strength.

The recesses 51a and 51b are so provided as to obtain, as in the above-mentioned embodiment, an area curve (D2 in FIG. 4) substantially the same as that of the displacement type ship. The recesses are, therefore, so designed as to be nearly submerged under the water line W.L1.

The hull 43 has such an area curve that the lateral cross-sectional area under the water line of the end of the stern corresponds to below 20% of the maximum cross-sectional area of the hull as measured under the water line (see FIG. 4).

Figure 13:
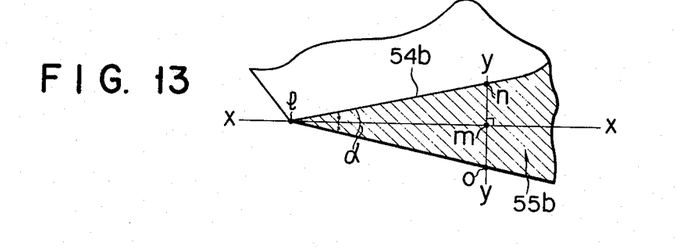
FIG. 13 is a fragmentary cross-sectional view of a blade portion of FIG. 9 as taken along a plane perpendicular to an outer edge of the blade portion.

In FIG. 13 a line bisecting an angle $\alpha$ made between the upper surface 54a or 54b and lower surface 46a or 46b of the blade portion 55a or 55b is represented by x—x and any line intersecting at a right angle to the bisecting line x—x is represented by y—y. In this embodiment, a distance l—m measured from an intersecting point l between the upper surface and the lower surface of the blade portion 55a or 55b to an intersecting point m between the line x—x and the line y—y will be expressed below with respect to a distance n—o measured from an intersecting point n between the line y—y and the upper surface of the blade portion 55a or 55b to an intersecting point O between the line y—y and the lower surface of the blade portion 55a or 55b.

$$\overline{lm} \leq 3 \cdot \overline{no}$$

Thus, $$\frac{\alpha}{2} \geq \tan^{-1} \frac{0.5}{3} = \tan^{-1} \frac{1}{6}$$

$$\alpha \geq 2 \tan^{-1} \frac{1}{6}$$

Where the hull is usually one piece molded from FRP, a coating agent such as gelcoat etc. is coated in the inner surface of a female mold. If, in this case, the angle $\alpha$ is so determined, that portion of the female mold corresponding to the blade portion is made sufficiently wider. As a result, uniform coating and drying can be effected.

The operation of the hull 43 is substantially the same as the above-mentioned embodiment. Since the lateral cross-sectional area as measured under the water line is gradually decreased due to the configuration of the recesses 51a and 51b and blade portions 55a and 55b, the hull can travel smoothly in the same manner as the displacement type ship, when it proceeds at low speeds. When the velocity of the ship increases from the low speed to the medium speed, water tends to cause the bow to be pushed upward, while at the same time the stern of the ship is pushed upward by the planing bottom per se. For this reason, the ship can assume a semi-planing attitude with a suitable attack angle. Since the front ends of the recesses 51a and 51b are situated rearwardly of the maximum width of the hull and the chine 47b is continuous with respect to the edges 56a and 56b of the blade portions 55a and 55b, water flowing along the side of the ship is not positively directed toward the recesses, thereby permitting the hull to readily assume a planing attitude. During the planing of the ship, the hull is supported on the water surface by the hull bottom 44 only and planes smoothly in a manner to maintain an appropriate attack angle.

Since, therefore, the hull according to this invention has such travelling characteristics as are most suitable even in both the low and high speed ranges, it can be suitably applied to a motor sailer designed to be travelled at low and high speeds.

Figure 14:
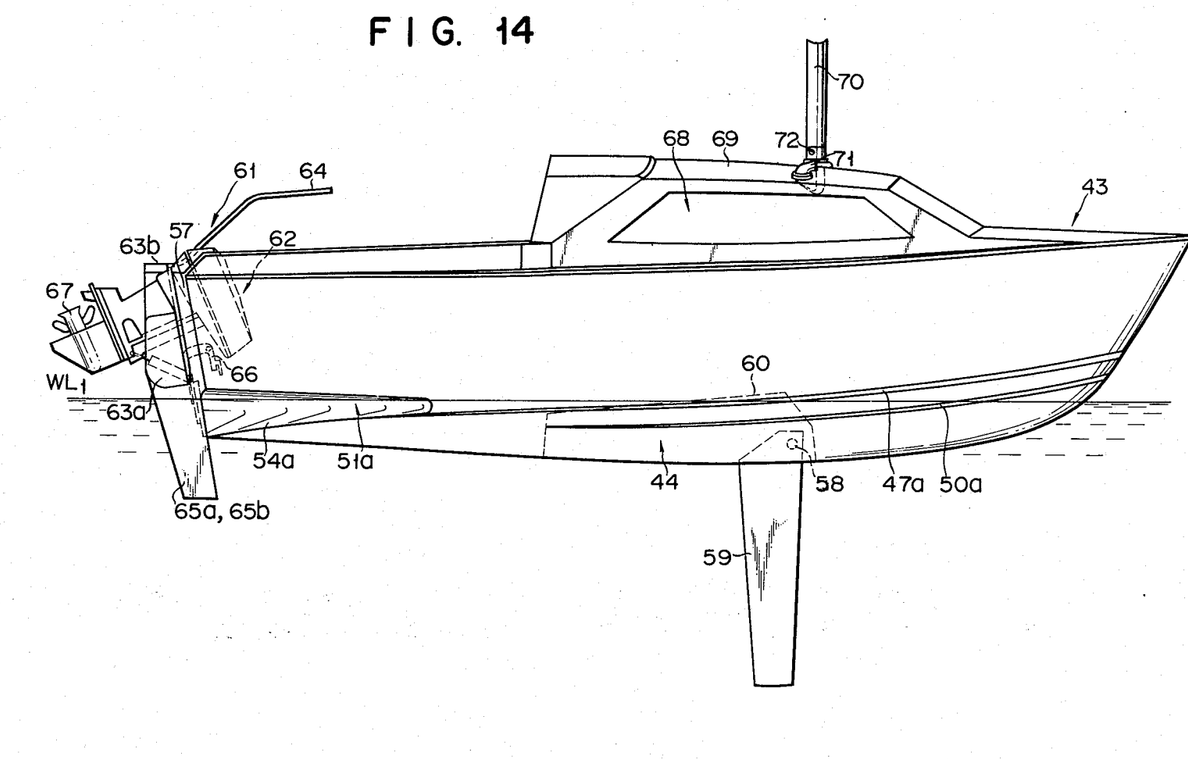
FIG. 14 is a view of the hull of FIG. 9 with fitting attached thereto, said hull being shown in a "sailing" condition.
Figure 15:
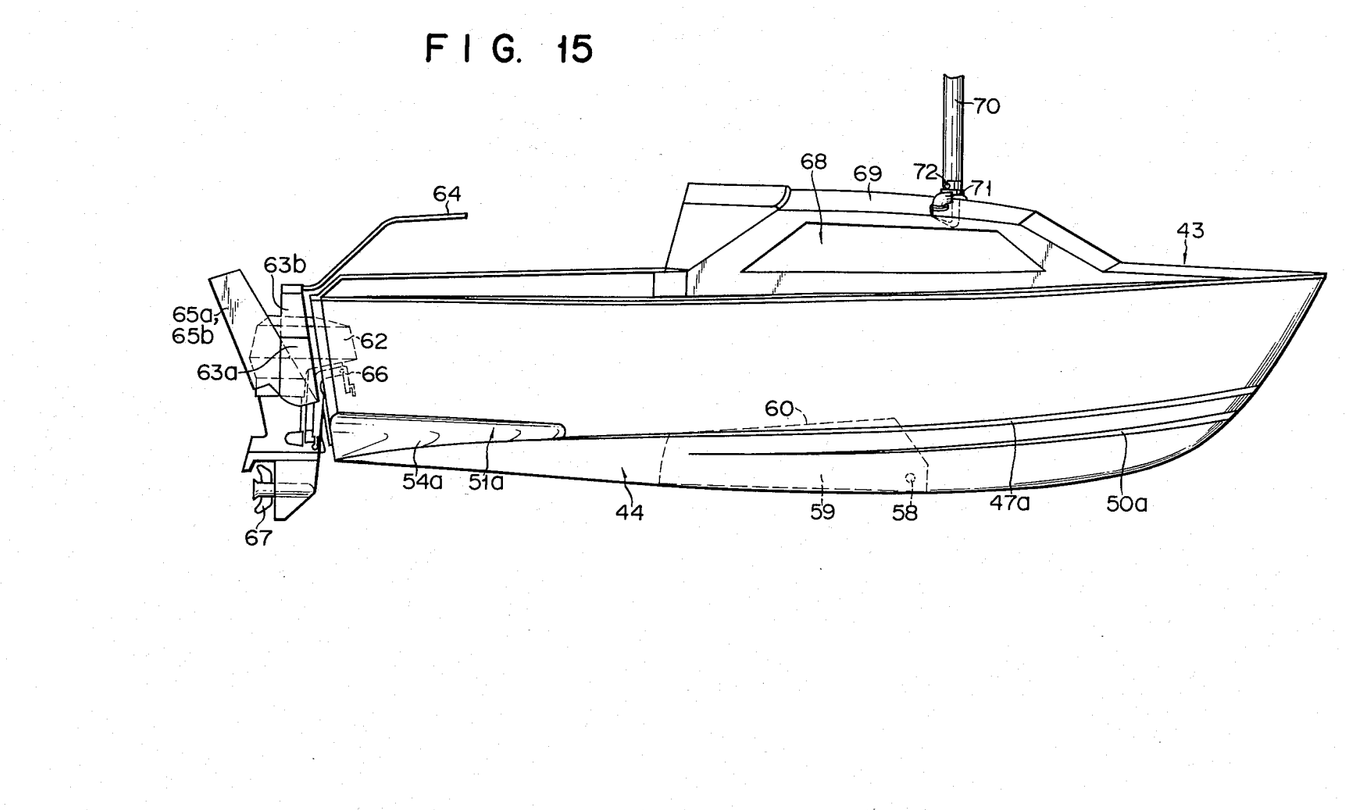
FIG. 15 is a view similar to FIG. 14 showing an "engine-powered" travelling state.

FIGS. 14 and 15 show the hull 43 of FIG. 9 in which fittings necessary for a motor sailer are provided. In the keel portion (an angular edge) of the hull bottom 44 a center board 59 is pivoted as at a pivot 58, and a recess 60 for receiving the center board 59 is provided. To the transom 57 are mounted a steering mechanism 61 and an outboard motor 62. The steering mechanism has a pair of rudder support members 63a, 63b swingably mounted to the transom 57, the support member 63b extending upwardly of the other member 63a. On the upper end of the support member 63b is mounted a steering tiller 64 for performing a steering operation. The support members 63a and 63b are connected to each other through a mechanism not shown and adapted to be swung in the same direction by the operation of the steering tiller 64. Rudder plates 65a and 65b are swingably supported by the support members 63a and 63b, respectively. The outboard motor 62 is secured by a clamp 66 to a support member provided on the transom 57 and adapted to be moved between a position in which the propeller 67 is lifted above the water line as shown in FIG. 14 and a position in which the propeller is lowered under the water line as shown in FIG. 15.

A cabin 68 is provided at the upper half portion of the hull 43, and a mast 70 and a ventilator 71 are mounted on a roof 69 of the cabin 68. The mast 70 carries during the travelling of the sailer a sail and a boom not shown and can be moved, with a pivot 72 as a center, from an "upright" position to a position to which it has been lowered in a rearward direction. The mast 70 can be detached, if necessary, from the roof 69 of the cabin 68 by removing the pivot 72.

During the "sailing" of the sailer, the center board 59 and rudder plates 65a and 65b are submerged below the water line as shown in FIG. 14 and the outboard motor 62 is swung into the position, as shown in FIG. 14, in which it is on board the sailer. The mast 70 is fixed in the upright position on the roof 69 of the cabin 68 and the sail and boom not shown are fixed on the mast 70. The propulsion force of the sailer is obtained by a sail and a direction control is effected by operating the rudder plates 65a and 65b by virtue of the steering tiller 64. During the "sailing" period, the sailer is in the low-speed travelling condition and the water line is situated at the W.L1, except during the rolling of the sailer. For this reason water in the neighborhood of the side of the sailer smoothly flows rearwardly along surfaces 54a and 54b of the hull.

During the engine-powered travelling of the sailer, the center board 59 is swung, by a mechanism not shown, into the recess 60 as shown in FIG. 15. The rudder plates 65a and 65b are lifted off the water line by a suitable means such as a rope and so held. The outboard motor 62 is so swung that the propeller 67 is submerged under the water line, and an operation shaft not shown of the motor is coupled to the steering tiller 64 so that it can be moved in interlock with the latter. The sail and boom is detached from the mast 70. In this case, the mast 70 may be placed either in the upright position or in the position in which it is fallen in the rearward direction. The mast 70 may be detached from the roof 69 of the cabin 68. The propulsion and direction controls of the sailer are effected by the outboard motor 62. When the sailer is travelled at high speeds, the sailer planes in a manner to be supported on the water line by the hull bottom.

What is claimed is:

1. A hull for a small-sized ship for travel at relatively lower and relatively higher velocities comprising a stern having a pair of recesses which are provided one at each lateral side of the stern and which extend toward the rear end of the stern beginning from a location rearwardly of midship, each of said recesses being defined by a wall surface, said recesses gradually drawing nearer to each other as they extend toward the rear end of the stern so as to form a lateral cross-sectional area of the stern under a normal water line which gradually decreases toward the rear end of the stern, a planing bottom having a buttock line extending from the midship toward the rear end of the stern in a manner to describe a substantially straight line, said planing bottom intersecting with the wall surface of each recess to form an outer edge therebetween at each lateral side of the stern, and a pair of chines provided one at each lateral side of the hull and extending from the forward section of the hull toward the rear end of the stern, said outer edge being continuously connected with the respective chine to form a continuous rear extension of said chine, each said recess having a depth extending from said outer edge toward the central longitudinal cross-section of the hull.

2. A hull according to claim 1, in which a cross-sectional area under the water line of the rear end of the stern corresponds to below 20% of a maximum cross-sectional area under the water line as measured anywhere between a fore perpendicular and an after perpendicular.

3. A hull according to claim 1, in which the forward end of the recesses is situated rearwardly of a maximum breadth of the hull.

4. A hull according to claim 3, in which the forward end of the recesses is situated forwardly of a 90% portion of a length between the fore and after perpendiculars as measured from the fore perpendicular.

5. A hull according to claim 4, in which a cross-sectional area under the water line of the rear end of the stern corresponds to below 20% of a maximum cross-sectional area under the water line as measured anywhere between the fore perpendicular and the after perpendicular.

6. A hull according to claim 1, in which said rear end of said stern has a transom arranged laterally and situated rearwardly of the rear end of the hull bottom, said transom being situated, during mooring, on the water line.

7. A hull according to claim 6, in which a center board is further provided at the bottom of the hull.

8. A hull according to claim 1, in which a center board is further provided at the bottom of the hull.

9. A hull according to claim 1, said hull being one piece molded from Fiber Reinforced Plastics.

10. A hull according to claim 1 in which the said wall of each recess includes a lower wall surface inclined outwardly and downwardly toward said outer edge.

11. A hull according to claim 1 in which each said recess has a curved inner wall surface.

12. A hull according to claim 10 in which an angle made between the lower wall surface of the inner wall of the recess and the outer surface of the planing bottom is defined as $$\alpha \geq 2 \tan^{-1} \frac{1}{6}$$

* * * * *